United States Patent
Yee et al.

(10) Patent No.: US 11,409,325 B2
(45) Date of Patent: Aug. 9, 2022

(54) ELECTRONIC APPARATUS

(71) Applicant: Samsung Display Co., Ltd., Yongin-Si (KR)

(72) Inventors: Dong-Su Yee, Cheonan-si (KR); Sung-Ki Jung, Asan-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/135,063

(22) Filed: Dec. 28, 2020

(65) Prior Publication Data
US 2021/0263551 A1 Aug. 26, 2021

(30) Foreign Application Priority Data
Feb. 26, 2020 (KR) .................. 10-2020-0023627

(51) Int. Cl.
*G06F 1/16* (2006.01)
*G02B 5/00* (2006.01)

(52) U.S. Cl.
CPC .......... *G06F 1/1601* (2013.01); *G02B 5/003* (2013.01)

(58) Field of Classification Search
CPC .... G06F 1/1601; G06F 1/1618; G06F 1/1637; G06F 1/1652; G06F 1/1641; G06F 2203/04102; G02B 5/003; G02B 5/005; G09F 9/301; H01L 27/3225; H01L 51/0097; H01L 51/5262; H01L 51/5284; H01L 2251/5338
See application file for complete search history.

(56) References Cited

U.S. PATENT DOCUMENTS

| | | | |
|---|---|---|---|
| 8,804,349 B2 | 8/2014 | Lee et al. | |
| 10,620,665 B2* | 4/2020 | Cheng | G06F 1/1626 |
| 11,038,004 B2* | 6/2021 | Kwon | H01L 27/3272 |
| 2018/0157362 A1 | 6/2018 | Kim et al. | |
| 2018/0314096 A1* | 11/2018 | Yang | G06F 3/0412 |
| 2019/0205603 A1* | 7/2019 | Lee | H01L 51/5284 |
| 2019/0250793 A1 | 8/2019 | Choi et al. | |
| 2019/0326367 A1* | 10/2019 | Jung | G06F 3/0412 |

(Continued)

FOREIGN PATENT DOCUMENTS

| | | |
|---|---|---|
| KR | 10-2018-0004427 | 1/2018 |
| KR | 10-2018-0063633 | 6/2018 |

(Continued)

*Primary Examiner* — Rockshana D Chowdhury
(74) *Attorney, Agent, or Firm* — F. Chau & Associates, LLC

(57) ABSTRACT

An electronic apparatus includes an electronic module and a display module including a plurality of pixels. The display module including a panel hole that extends through an upper surface and a lower surface of the display module and overlaps the electronic module. An impact absorbing layer is disposed on the display module and includes a lower surface adjacent to the display module and an upper surface opposite to the lower surface. A light shielding pattern is disposed on the upper surface of the impact absorbing layer. The impact absorbing layer further includes a transmission opening that is surrounded by the light shielding pattern and overlaps the panel hole and the electronic module. A window is disposed on the impact absorbing layer. The light shielding pattern has a closed-line shape.

23 Claims, 13 Drawing Sheets

(56) References Cited

U.S. PATENT DOCUMENTS

Figure 1A:
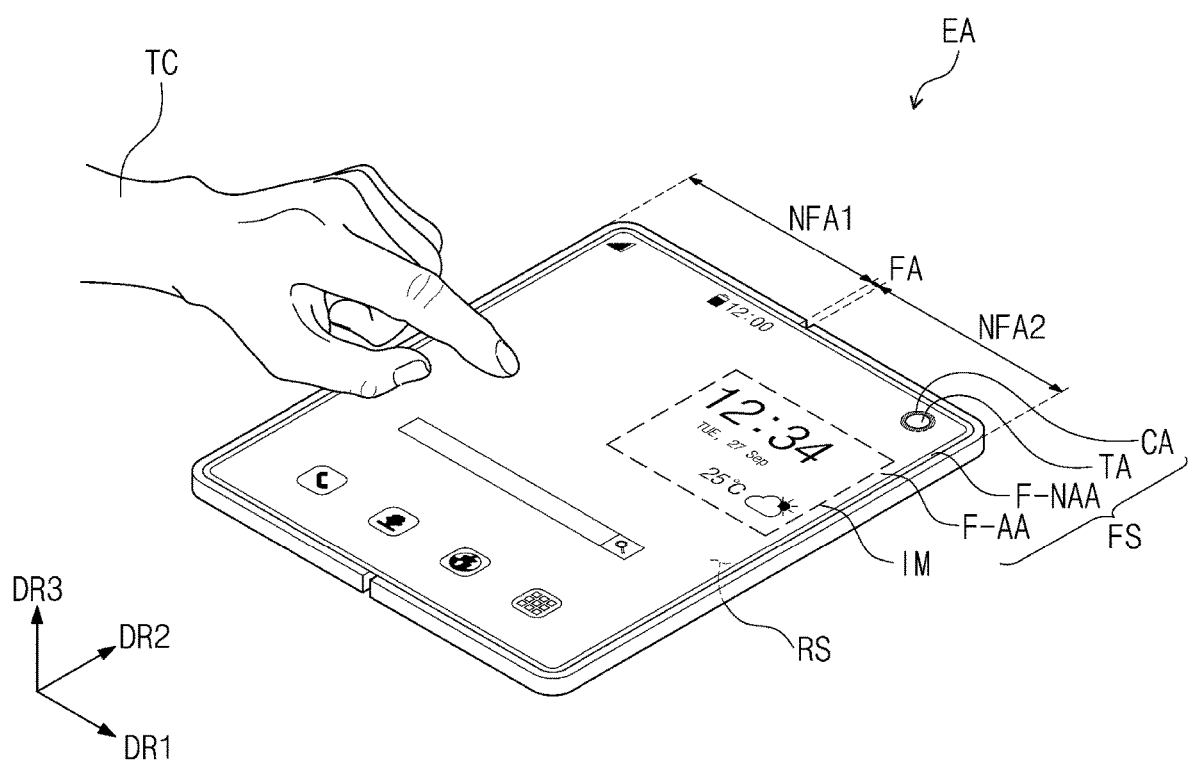

| | | | |
|---|---|---|---|
| 2020/0192148 A1* | 6/2020 | Kim | G02F 1/133308 |
| 2020/0273934 A1 | 8/2020 | You et al. | |
| 2020/0328375 A1* | 10/2020 | Won | H01L 27/3225 |
| 2021/0119170 A1* | 4/2021 | Eo | H01L 51/5237 |
| 2021/0202622 A1* | 7/2021 | Kim | H01L 51/5246 |

FOREIGN PATENT DOCUMENTS

| | | |
|---|---|---|
| KR | 10-1986762 | 6/2019 |
| KR | 10-2020-0104474 | 9/2020 |

\* cited by examiner

ELECTRONIC APPARATUS

DETAILED DESCRIPTION OF EXEMPLARY EMBODIMENTS

In the present disclosure, it will be understood that when an element or layer is referred to as being "on", "connected to" or "coupled to" another element or layer, it can be directly on, connected or coupled to the other element or layer or intervening elements or layers may be present. However, when an element or layer is referred to as being "directly on", "directly connected to" or "directly coupled to" another element or layer, no intervening elements or layers may be present.

Like numerals refer to like elements throughout. In the drawings, the thickness, ratio, and dimension of components are exaggerated for effective description of the technical content.

As used herein, the term "and/or" may include any and all combinations of one or more of the associated listed items.

It will be understood that, although the terms first, second, etc. may be used herein to describe various elements, components, regions, layers and/or sections, these elements, components, regions, layers and/or sections should not be limited by these terms. Instead, these terms are only used to distinguish one element, component, region, layer or section from another element, component, region, layer or section. Therefore, a first element, component, region, layer or section discussed below could be termed a second element, component, region, layer or section without departing from the teachings of the present inventive concepts. As used herein, the singular forms, "a", "an" and "the" are intended to include the plural forms as well, unless the context clearly indicates otherwise.

Spatially relative terms, such as "beneath", "below", "lower", "above", "upper" and the like, may be used herein for ease of description to describe one element or feature's relationship to another element(s) or feature(s) as illustrated in the figures. However, exemplary embodiments of the present inventive concepts are not limited by these terms.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be further understood that the terms "may include" and/or "including", when used in this specification, specify the presence of stated features, integers, steps, operations, elements, and/or components, but do not preclude the presence or addition of one or more other features, integers, steps, operations, elements, components, and/or groups thereof. Hereinafter, the present inventive concepts will be explained in detail with reference to the accompanying drawings.

Figure 1B:
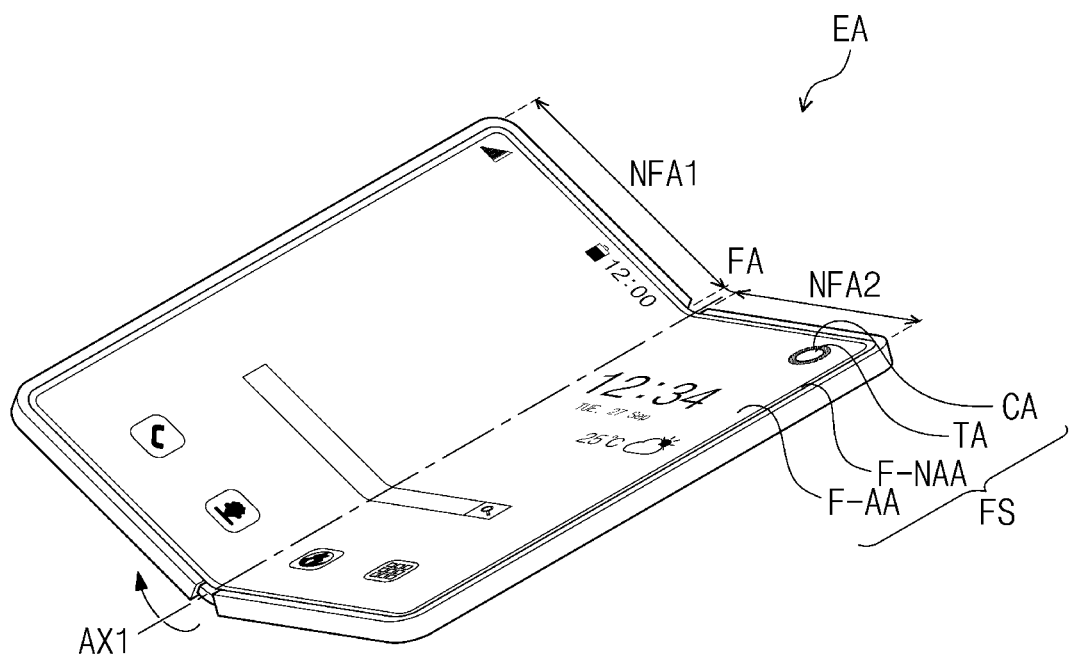
Figure 1B:
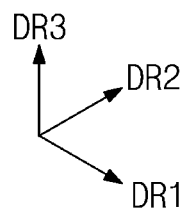
Figure 1C:
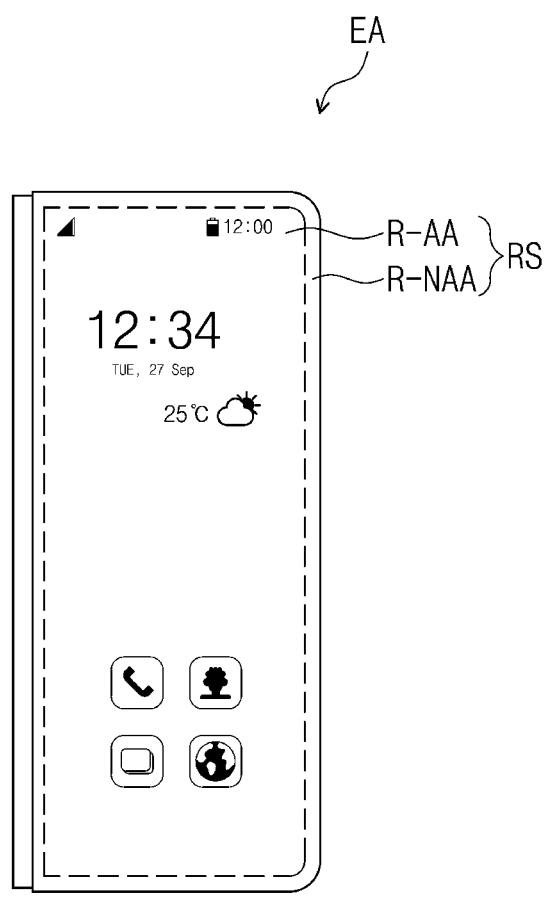
Figure 1D:
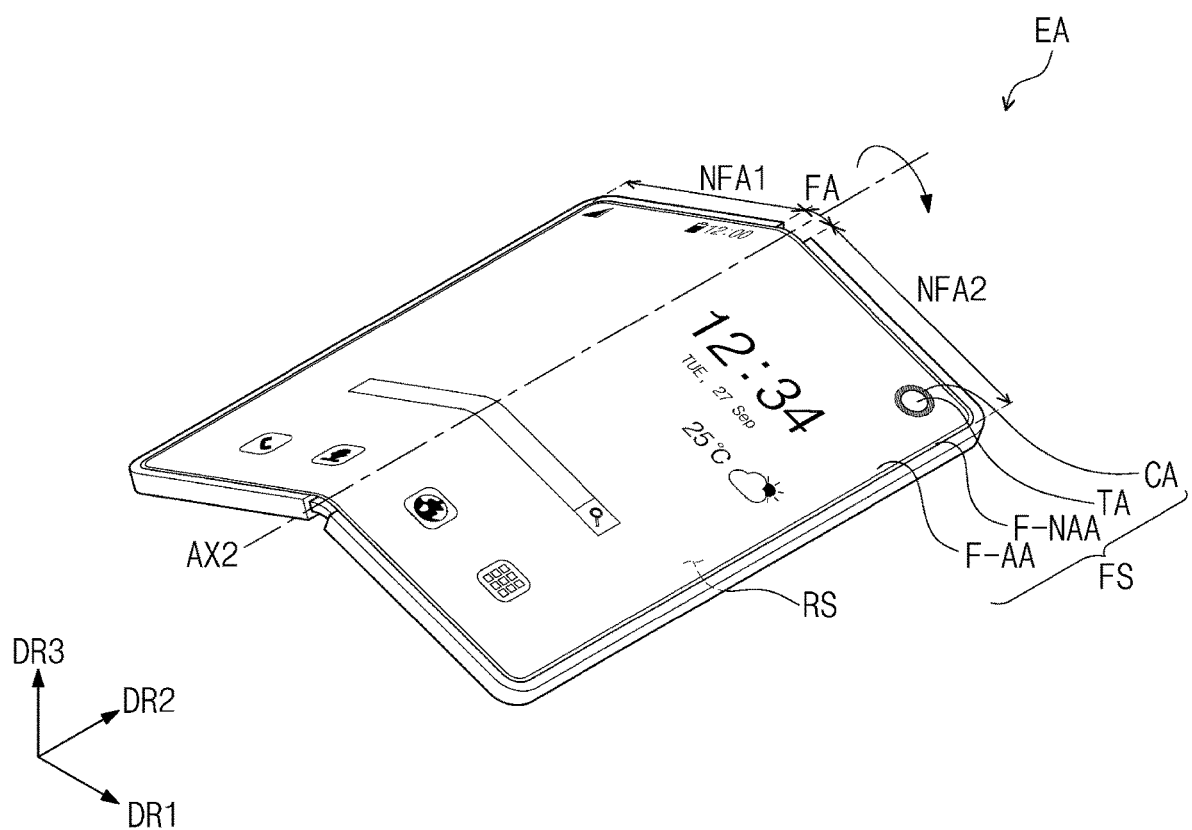

FIG. 1A is a perspective view showing an electronic apparatus EA in an unfolded state according to an exemplary embodiment of the present inventive concepts. FIG. 1B is a perspective view showing the electronic apparatus EA in a folded state according to an exemplary embodiment of the present inventive concepts. FIG. 1C is a plan view showing the electronic apparatus EA in the folded state according to an exemplary embodiment of the present inventive concepts. FIG. 1D is a perspective view showing the electronic apparatus EA in the folded state according to an exemplary embodiment of the present inventive concepts.

Referring to the exemplary embodiment of FIG. 1A, the electronic apparatus EA may be an apparatus that is activated in response to electrical signals. The electronic apparatus EA may include various exemplary embodiments. For example, the electronic apparatus EA may include a tablet computer, a notebook computer, a computer, or a smart television. However, exemplary embodiments of the present inventive concepts are not limited thereto and the electronic apparatus EA may be other small, medium or large-sized electronic devices. In the present exemplary embodiment, a smartphone will be described as a representative example of the electronic apparatus EA.

The electronic apparatus EA may display an image IM through a first display surface FS that is substantially defined in a plane extending in a first direction DR1 and a second direction DR2. In the exemplary embodiment shown in FIG. 1A, the first and second directions DR1, DR2 may be substantially perpendicular to each other. However, exemplary embodiments of the present inventive concepts are not limited thereto and the first and second directions DR1, DR2 may cross each other at various different angles in other exemplary embodiments. The image IM is projected on the first display surface FS toward a third direction DR3 that is substantially perpendicular to the first and second directions DR1, DR2 and may be a thickness direction of the electronic apparatus EA. In an exemplary embodiment, the first display surface FS through which the image IM is displayed may correspond to a front surface of the electronic apparatus EA. In an exemplary embodiment, the image IM may include one or more motion images and/or still images. In the exemplary embodiment of FIG. 1A, a clock widget is shown as an example of the image IM. However, exemplary embodiments of the present inventive concepts are not limited thereto.

In the present exemplary embodiment, upper (or front) and lower (or rear) surfaces of each member of the electronic apparatus EA may be defined with respect to a direction in which the image IM is displayed. The upper and lower surfaces may be opposite to each other in the third direction DR3, and a normal line direction of each of the upper and lower surfaces may be substantially parallel to the third direction DR3.

A distance between the upper surface and the lower surface in the third direction DR3 of the electronic apparatus EA may correspond to a thickness or a height of the electronic apparatus EA in the third direction DR3. Meanwhile, directions indicated by the first, second, and third directions DR1, DR2, and DR3 may be relative to each other and may be changed to other directions.

The electronic apparatus EA may sense an external input TC applied thereto from outside of the electronic apparatus EA (e.g., the external environment). The external input TC may include various forms of inputs provided from outside of the electronic apparatus EA. For example, in an exemplary embodiment, the external input TC may include a proximity input (e.g., hovering) applied when an object approaches or is adjacent to the electronic apparatus EA at a predetermined distance and/or a touch input by a user's body (e.g., a touch applied by the user's finger). In addition, the external input TC may include various other forms of force, pressure, light, etc., and the external input TC is not particularly limited to the above examples. FIG. 1A shows an example of an external input TC applied by a touch of the user's finger for convenience of illustration.

The electronic apparatus EA according to the present exemplary embodiment may include the first display surface FS and a second display surface RS. The first display surface FS may include a first active area F-AA and a first peripheral area F-NAA. The second display surface RS may be opposite to the first display surface FS (e.g., in the third direction DR3). The first active area F-AA according to the present inventive concepts may include a light shielding area CA and a transmission area TA.

The first active area F-AA may be activated in response to the electrical signals. The image may be displayed through the first active area F-AA, and various external inputs TC may be sensed through the first active area F-AA. The first peripheral area F-NAA may be defined adjacent to the first active area F-AA. For example, the first peripheral area F-NAA may surround one or more sides of the first active area F-AA. As shown in the exemplary embodiment of FIG. 1A, the first peripheral area F-NAA may surround all four sides of the first active area F-AA. Accordingly, the first active area F-AA may have a shape that is substantially defined by the first peripheral area F-NAA.

However, exemplary embodiments of the present inventive concepts are not limited thereto and in other exemplary embodiments, the first peripheral area F-NAA may not be disposed on all sides of the first active area F-AA. For example, the first peripheral area F-NAA may be defined adjacent to only one side of the first active area F-AA or may be omitted altogether. The electronic apparatus according to exemplary embodiments of the present inventive concepts may include various arrangements of the first active area F-AA and the first peripheral area F-NAA, and the electronic apparatus should not be particularly limited.

The electronic apparatus EA according to the present exemplary embodiment may include at least one folding area FA and a plurality of non-folding areas, such as a first non-folding area NFA1 and a second non-folding area NFA2 extending from the folding area FA.

Referring to the exemplary embodiment of FIG. 1B, the electronic apparatus EA may include a first folding axis AX1 that shown in dotted lines that extends in the second direction DR2. As shown in the exemplary embodiment of FIG. 1B, the first folding axis AX1 may extend substantially in the second direction DR2 on the folding area FA of the first display surface FS. In the present exemplary embodiment, the first and second non-folding areas NFA1 and NFA2 may be spaced apart from each other in the first direction DR1 with the folding area FA interposed therebetween and the first and second non-folding areas NFA1 and NFA2 may extend from the folding area FA in the first direction DR1. For example, the first non-folding area NFA1 may extend from the left side of the folding area FA in the first direction DR1, and the second non-folding area NFA2 may extend from the right side of the folding area FA in the first direction DR1.

The electronic apparatus EA may be folded about the first folding axis AX1 to be in an in-folding state (e.g., a folded state) where a first surface of the first display surface FS that overlaps the first non-folding area NFA1 faces a second surface of the first display surface FS that overlaps the second non-folding area NFA2.

Referring to the exemplary embodiment of FIG. 1C, the second display surface RS may be viewed by a user during the in-folding state of the electronic apparatus EA. In an exemplary embodiment, the second display surface RS may include a second active area R-AA through which the image is displayed. The second active area R-AA may be activated in response to electrical signals. The second active area R-AA may be an area through which the image is displayed and various external inputs TC are sensed as described with respect to the first active area F-AA.

A second peripheral area R-NAA may be defined adjacent to the second active area R-AA. The second peripheral area R-NAA may surround one or more sides of the second active area R-AA. For example, as shown in the exemplary embodiment of FIG. 1C, the second peripheral area R-NAA may surround all four sides of the second active area R-AA. However, exemplary embodiments of the present inventive concepts are not limited thereto. In addition, in an exemplary embodiment, the second display surface RS may further include an electronic module area in which an electronic module is disposed, and the second display surface RS is not limited to the exemplary embodiment shown in FIG. 1C.

Referring to the exemplary embodiment of FIG. 1D, the electronic apparatus EA may include a second folding axis AX2 in a folding area FA that extends substantially in the second direction DR2 on the second display surface RS.

The electronic apparatus EA may be folded about the second folding axis AX2 to be in an out-folding state where a first surface of the second display surface RS which overlaps the first non-folding area NFA1 faces the second surface of the second display surface RS which overlaps the second non-folding area NFA2.

However, exemplary embodiments of the electronic apparatus EA are not limited thereto. For example, in other exemplary embodiments, the electronic apparatus EA may be folded about a plurality of folding axes that are variously arranged such that a portion of the first display surface FS and a portion of the second display surface RS face each other, and the number of the folding axes and the number of non-folding areas should not be particularly limited.

Figure 2:
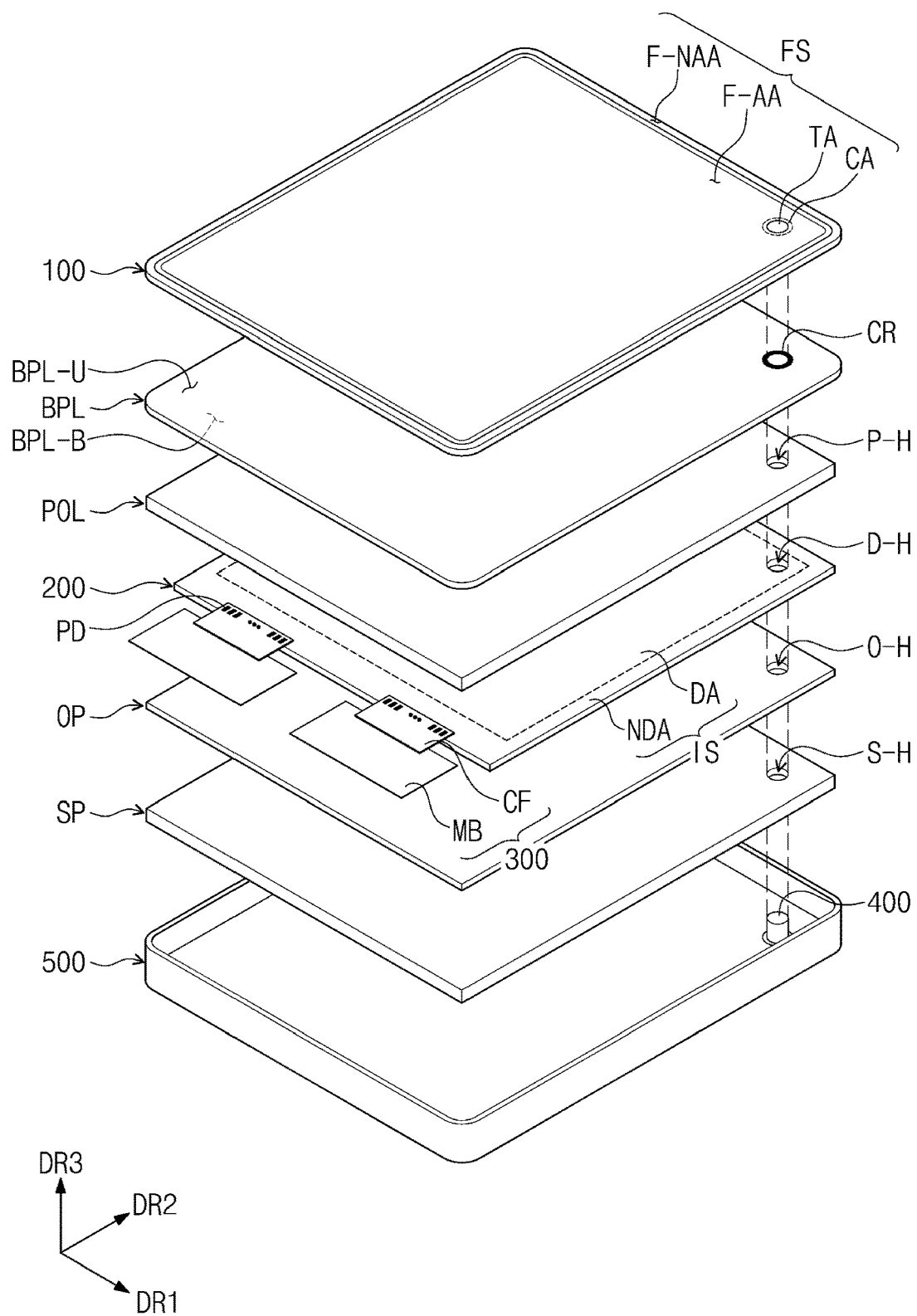
Figure 3:
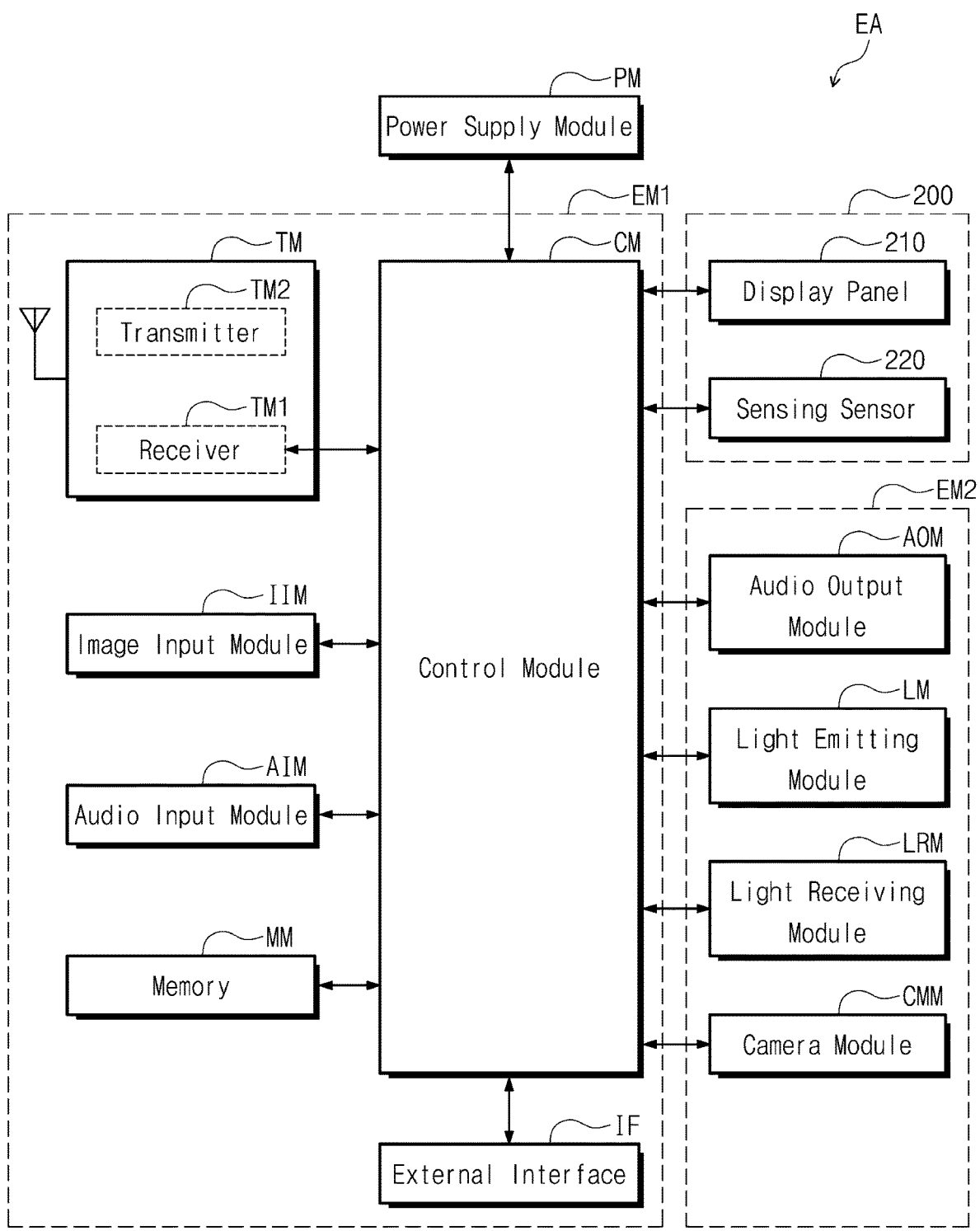
Figure 4A:
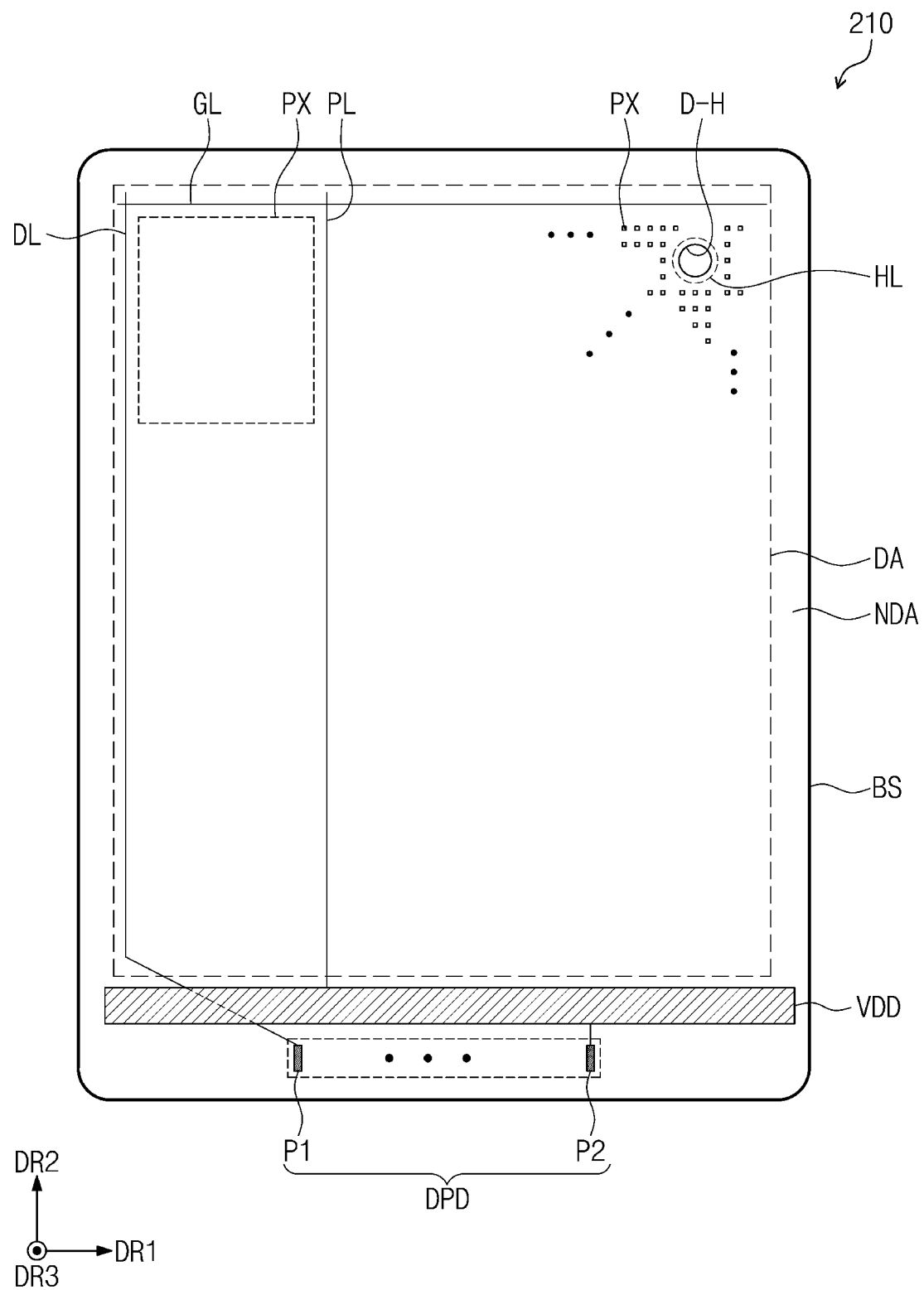
Figure 4B:
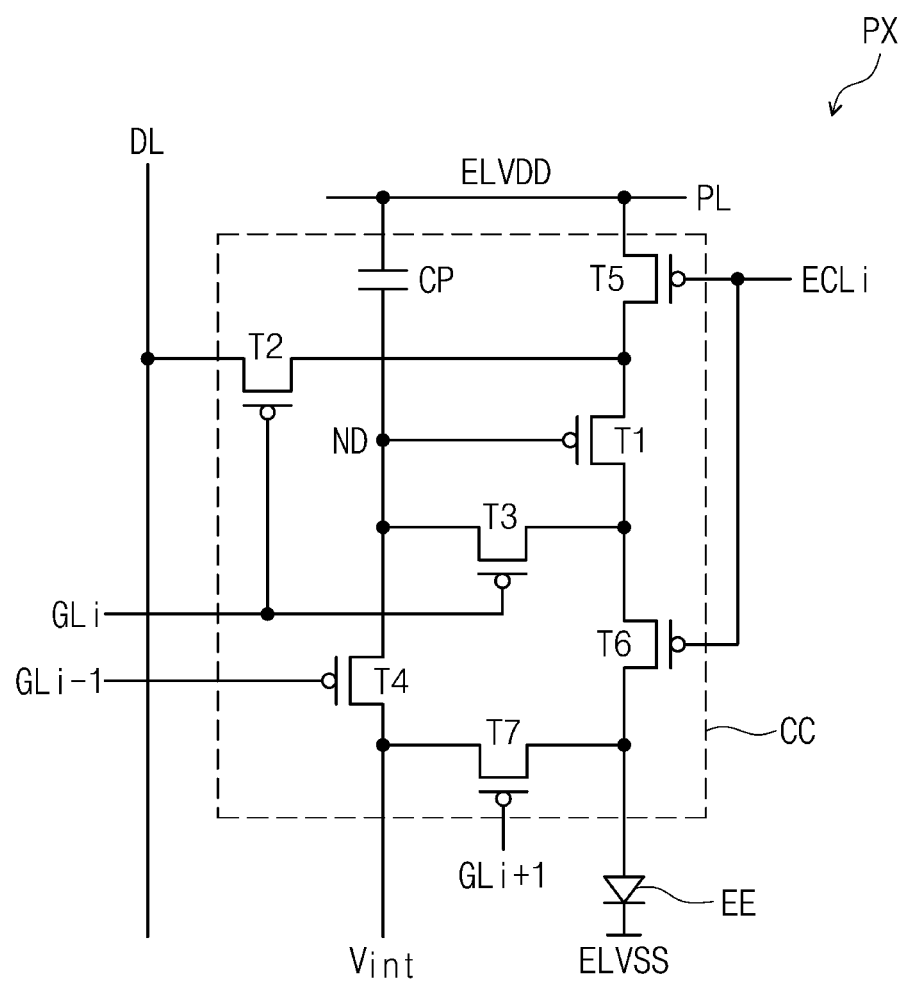
Figure 4C:
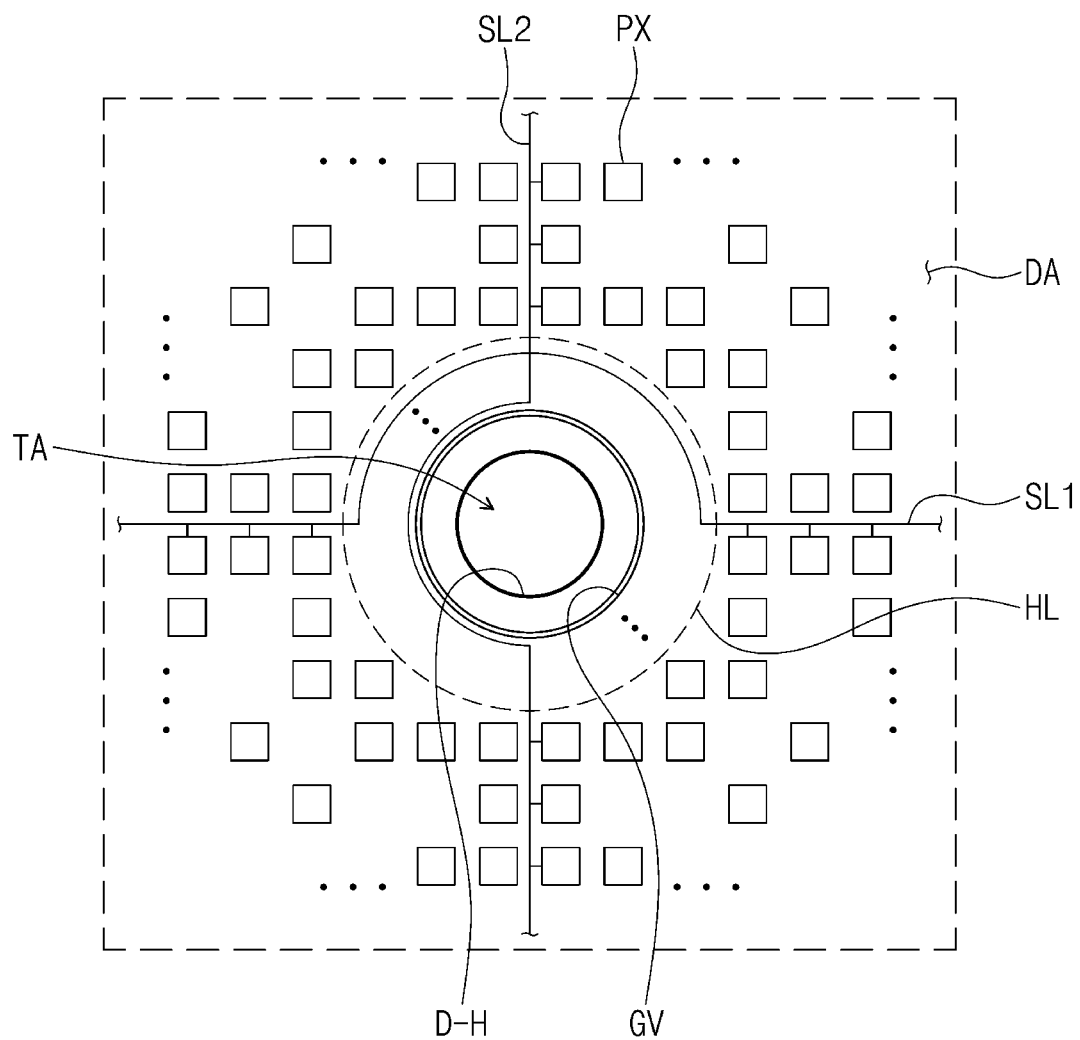

FIG. 2 is an exploded perspective view showing the electronic apparatus EA according to an exemplary embodiment of the present inventive concepts. FIG. 3 is a block diagram showing the electronic apparatus EA shown in the exemplary embodiment of FIG. 1A. FIG. 4A is a plan view showing a display panel 210 according to an exemplary embodiment of the present inventive concepts. FIG. 4B is an equivalent circuit diagram showing a pixel PX according to an exemplary embodiment of the present inventive concepts. FIG. 4C is an enlarged plan view showing an area of the display panel 210 according to an exemplary embodiment of the present inventive concepts.

Referring to the exemplary embodiment of FIG. 2, the electronic apparatus EA may include a window 100, a display module 200, a circuit board 300, an electronic module 400, and an external case 500. In addition, the electronic apparatus EA may include an impact absorbing layer BPL, an optical member POL, a compensation film OP, and a protective member SP which may enhance the performance of the electronic apparatus EA having folding characteristics.

The window 100 may be disposed on the display module 200 (e.g., in the third direction DR3). The window 100 may provide the first and second display surfaces FS and RS (refer to FIG. 1A) and may protect the display module 200. In an exemplary embodiment, the window 100 may include a material having a high light transmittance. For example, in an exemplary embodiment, the window 100 may include a glass substrate, a sapphire substrate, or a plastic film. However, exemplary embodiments of the present inventive concepts are not limited thereto. The window 100 may be disposed in a portion of the external case 500. An area of the external case 500 in which the window 100 is disposed may correspond to the second display surface RS. However, for the convenience of explanation, the external case 500 shown in the exemplary embodiment of FIG. 2 may have an integral shape.

The window 100 may have a single-layer or a multi-layer structure. For example, in an exemplary embodiment, the window 100 may have a stack structure including a plurality of plastic films attached to each other by an adhesive or a stack structure of a glass substrate and at least one plastic film attached to the glass substrate by an adhesive. However, exemplary embodiments of the present inventive concepts are not limited thereto.

The first active area F-AA, the first peripheral area F-NAA, the light shielding area CA, and the transmission area TA of the first display surface FS included in the above-described electronic apparatus EA may be described as being defined in the window 100.

In the window 100, a first area that a light generated by the display module 200 is transmitted therethrough may be defined as the first active area F-AA of the first display surface FS, and a bezel area of the window 100 may be defined as the first peripheral area F-NAA. In addition, a second area that the light generated by the display module 200 is transmitted therethrough in the window 100 may be defined as the second active area R-AA of the second display surface RS. The bezel area of the window 100 may be defined as the second peripheral area R-NAA.

In the present disclosure, the transmission area TA may be defined as an area overlapping (e.g., in the third direction DR3) the electronic module 400 described later, and the light shielding area CA surrounding the transmission area TA may be defined as an area overlapping (e.g., in the third direction DR3) a light shielding pattern CR.

The display module 200 may serve as an output device. For example, the display module 200 may display the image IM through the first and second active areas F-AA and R-AA, and the user may view the image IM to acquire information therefrom. In addition, the display module 200 may serve as an input device to sense the external input TC applied to the first and/or second active areas F-AA and R-AA.

The display module 200 may include an upper surface IS and a rear surface opposite to the upper surface IS. The image is displayed through the upper surface IS, and the upper surface IS may include a display area DA in which the external input TC is sensed and a non-display area NDA that is adjacent to the display area DA. A driving circuit and lines connected to the driving circuit may be arranged in the non-display area NDA to drive the pixel PX, and lines connected to sensing electrodes that sense the external input TC may be arranged in the non-display area NDA. In an exemplary embodiment, the display area DA may overlap (e.g., in the third direction DR3) at least a portion of the first active area F-AA, and the non-display area NDA may overlap (e.g., in the third direction DR3) at least a portion of the first peripheral area F-NAA.

As shown in the exemplary embodiment of FIG. 2, a panel hole D-H may be defined through (e.g., extend in the third direction DR3 therethrough) the upper surface IS and a lower surface of the display module 200. As shown in the exemplary embodiment of FIG. 2, the panel hole D-1 may overlap (e.g., in the third direction DR3) the electronic module 400.

The circuit board 300 may be connected to the display module 200. As shown in the exemplary embodiment of FIG. 2, the circuit board 300 may include a flexible board CF and a main board MB. In an exemplary embodiment, the flexible board CF may include an insulating film and conductive lines mounted on the insulating film that are connected to the main board MB. The conductive lines may be connected to pads PD to electrically connect the circuit board 300 and the display module 200.

In an exemplary embodiment, the flexible board CF may be assembled in a curved state. Accordingly, the main board MB may be disposed on the lower surface of the display module 200 and may be stably accommodated in a space provided by the external case 500. However, exemplary embodiments of the present inventive concepts are not limited thereto. For example, in another exemplary embodiment, the flexible board CF may be omitted and the main board MB may be connected directly to the display module 200.

The main board MB may include signal lines and electronic elements. The electronic elements may be connected to the signal lines and may be electrically connected to the display module 200. The electronic elements may generate various electrical signals, such as a signal used to generate the image IM or a signal used to sense the external input TC. The electronic elements may process sensed signals. In an exemplary embodiment, the main board MB may be provided in plural to correspond to electrical signals generated and processed thereby. However, exemplary embodiments of the present inventive concepts are not limited thereto.

As shown in the exemplary embodiment of FIG. 2, the electronic module 400 may be accommodated in the external case 500. The electronic module 400 may be disposed to overlap (e.g., in the third direction DR3) an optical member hole P-H, the panel hole D-H, a compensation film hole O-H, and a protective member hole S-H, which are defined through the optical member POL, the display module 200, the compensation film OP, and the protective member SP, respectively, which may each be components disposed on the electronic module 400. The electronic module 400 may receive inputs applied thereto from the outside through the transmission area TA of the window 100 overlapping the optical member hole P-Hl, the panel hole D-H, the compensation film hole O-H, and the protective member hole S-H or may provide outputs to the user through the transmission area TA. The transmission area TA according to the present inventive concepts may be changed in various shapes in the first active area F-AA depending on the area in which the electronic module 400 is disposed. In addition, positions of the optical member hole P-H, the panel hole D-H, the compensation film hole O-H, and the protective member hole S-H defined through the components disposed on the electronic module 400 may be changed in various ways depending on the area in which the electronic module 400 is disposed.

According to the present inventive concepts, the electronic module 400 may be disposed to overlap (e.g., in the third direction DR3) the first and second active areas F-AA and R-AA (refer to FIGS. 1A and 1C) of the window 100. Therefore, the electronic apparatus may not include a separate space to dispose the electronic module 400 in the first and second peripheral areas F-NAA and R-NAA (refer to FIGS. 1A and 1C). Accordingly, the first and second peripheral areas F-NAA and R-NAA (refer to FIGS. 1A and 1C) included in the electronic apparatus EA may have a reduced size as compared to an electronic apparatus that includes the electronic module in the first and second peripheral areas F-NAA and R-NAA. Thus, an electronic apparatus EA with enhanced aesthetics may be provided.

The external case 500 may be coupled with the window 100. The external case 500 may provide the rear surface of the electronic apparatus EA. The external case 500 may be coupled with the window 100 to provide an inner space therebetween. The display module 200, the circuit board 300, and the electronic module 400 may be accommodated in the inner space. In an exemplary embodiment, the external case 500 may include a material having a relatively high rigidity. For example, the external case 500 may include a plurality of frames and/or plates of a glass, plastic, or metal material. However, exemplary embodiments of the present inventive concepts are not limited thereto. The external case 500 may stably protect the components of the electronic apparatus EA, which are accommodated in the inner space, from external impacts. The window 100 may be further disposed on one surface of the external case 500 (e.g., a rear surface) to provide the second display surface RS.

As shown in the exemplary embodiment, the impact absorbing layer BPL may be disposed between the window 100 and the display module 200 (e.g., in the third direction DR3). An upper surface BPL-U of the impact absorbing layer BPL may be disposed adjacent to the window 100, and a lower surface BPL-B of the impact absorbing layer BPL may be disposed adjacent to the display module 200. For example, as shown in the exemplary embodiment of FIG. 2, the upper surface BPL-U of the impact absorbing layer BPL may be directly below the window 100 and may directly contact a lower surface of the window 100. However, exemplary embodiments of the present inventive concepts are not limited thereto. The impact absorbing layer BPL may protect the components of the display module 200 from a stress applied thereto during the folding operation, etc.

In an exemplary embodiment, the impact absorbing layer BPL may include one of a sponge, a foam, and a urethane resin. However, exemplary embodiments of the present inventive concepts are not limited thereto. In an exemplary embodiment, the impact absorbing layer BPL may include a transparent material.

In an embodiment in which the impact absorbing layer BPL includes the foam, the impact absorbing layer BPL may include a matrix member and a plurality of pores. The pores may be distributed and defined in the matrix member. The impact absorbing layer BPL may have elasticity and may have a porous structure.

The matrix member may include a flexible material. For example, the matrix member may include a synthetic resin. In an exemplary embodiment, the matrix member may include at least one material selected from acrylonitrile butadiene styrene copolymer (ABS), polyurethane (PU), polyethylene (PE), ethylene vinyl acetate copolymer (EVA), and polyvinyl chloride (PVC).

The pores may easily absorb impacts applied to the impact absorbing layer BPL. The pores may be defined by the porous structure of the impact absorbing layer BPL. The pores may allow the impact absorbing layer BPL to easily deform and change the shape thereof. Thus, the elasticity of the impact absorbing layer BPL may be improved, and an impact resistance of the electronic apparatus EA may be improved. In an exemplary embodiment, the impact absorbing layer BPL may include a plurality of synthetic resins. However, exemplary embodiments of the present inventive concepts are not limited thereto.

The light shielding pattern CR may be disposed on the upper surface BPL-U of the impact absorbing layer BPL. For example, the light shielding pattern CR may be disposed directly on the upper surface BPL-U of the impact absorbing layer BPL. The light shielding pattern CR may include a transmission opening C-OP (refer to FIG. 5) defined therein. The transmission opening C-OP of the light shielding pattern CR may overlap (e.g., in the third direction DR3) the electronic module 400. The inner surface of the light shielding pattern CR may surround the transmission opening C-OP. For example, as shown in the exemplary embodiment of FIG. 2, the inner surface of the light shielding pattern CR may be disposed immediately around the perimeter of the transmission opening C-OP. In an exemplary embodiment, the light shielding pattern CR may have a black color. However, exemplary embodiments of the present inventive concepts are not limited thereto. For example, the light shielding pattern CR may include various different materials that shield light.

In an exemplary embodiment, the light shielding pattern CR may be manufactured by printing a light shielding material on the upper surface BPL-U of the impact absorbing layer BPL. In this exemplary embodiment, the light shielding material may not be printed in an area on the upper surface BPL-U of the impact absorbing layer BPL overlapping the electronic module 400 (e.g., in the third direction DR3), and the area of the upper surface BPL-U of the impact absorbing layer BPL that is not printed by the light shielding material may be defined as the transmission opening C-OP.

In an exemplary embodiment, the light shielding pattern CR may have a closed-line shape that surrounds the electronic module 400. Accordingly, in an exemplary embodiment, the light shielding pattern CR may have a ring shape. The light shielding area CA of the window 100 may be defined to overlap (e.g., in the third direction DR3) the light shielding pattern CR.

Pixels PX of the display module 200 may be spaced apart from each other with the panel hole D-H interposed therebetween and may receive the same signal. In this exemplary embodiment, the display module 200 may include first and second hole lines SL1 and SL2 (refer to FIG. 4C) that connect the pixels PX spaced apart from each other with the panel hole D-H interposed therebetween. As shown in the exemplary embodiment of FIG. 4C, the first and second hole lines SL1 and SL2 may surround at least a portion of the panel hole D-H and may be disposed adjacent to the panel hole D-H. The light shielding pattern CR may cover at least a partial portion of the first and second hole lines SL1 and SL2.

Since the electronic apparatus EA of the present exemplary embodiment includes the light shielding pattern CR disposed on the upper surface BPL-U of the impact absorbing layer BPL, defects in which the first and second hole lines SL1 and SL2 are viewed by the user may be prevented. Accordingly, the display properties of the electronic apparatus EA may be increased.

The optical member POL may be disposed under the window 100. For example, as shown in the exemplary embodiment of FIG. 2, the optical member POL may be disposed between the display module 200 and the impact absorbing layer BPL (e.g., in the third direction DR3).

The optical member POL may reduce an external light reflectance of the display module 200 with respect to a light incident on the display module 200. For example, the optical member POL may include at least one of an anti-reflective film, a polarizing film, a color filter, and a gray filter.

According to an exemplary embodiment of the present inventive concepts, the optical member POL may be provided with an optical member hole P-H defined through upper and lower surfaces of the optical member POL. The optical member hole P-H may overlap with the electronic module 400 (e.g., in the third direction DR3). The optical member hole P-H may be aligned with the panel hole D-H (e.g., aligned in the first and second directions DR1 and DR2).

As shown in the exemplary embodiment of FIG. 2, the compensation film OP may be disposed between the display module 200 and the protective member SP (e.g., in the third direction DR3). The compensation film OP may provide a neutral surface which minimizes the stress applied to the display module 200 during the folding operation.

According to an exemplary embodiment of the present inventive concepts, the compensation film OP may be provided with a compensation film hole O-H defined through upper and lower surfaces of the compensation film OP. The compensation film hole O-H may overlap with the electronic module 400 (e.g., in the third direction DR3). The compensation film hole O-H may be aligned with the optical member hole P-H and the panel hole D-H (e.g., aligned in the first and second directions DR1 and DR2).

In an exemplary embodiment, the compensation film OP may include a plastic film including one or more compounds selected from the group consisting of polyethersulfone (PES), polyacrylate, polyetherimide (PEI), polyethylene naphthalate (PEN), polyethylene terephthalate (PET), polyphenylene sulfide (PPS), polyarylate, polyimide (PI), polycarbonate (PC), and poly(arylene ether sulfone).

However, exemplary embodiments of the present inventive concepts are not limited thereto and the materials for the compensation film OP are not limited to plastic resins and may include an organic-inorganic composite material. In an exemplary embodiment, the compensation film OP may include a porous organic layer and an inorganic material filled in pores of the organic layer.

As shown in the exemplary embodiment of FIG. 2, the protective member SP may be disposed under the display module 200 and the compensation film OP (e.g., in the third direction DR3). The protective member SP may protect the display module 200 from external impacts.

In an exemplary embodiment, the protective member SP may include a plurality of layers. For example, the protective member SP may include a light shielding layer, a heat dissipating layer, a cushion layer, and a plurality of adhesive layers. However, exemplary embodiments of the present inventive concepts are not limited thereto.

The light shielding layer may prevent components disposed on the rear surface of the display module 200 from being viewed by the user. In an exemplary embodiment, the light shielding layer may include a binder and a plurality of pigment particles dispersed in the binder. The pigment particles may include a carbon black.

As the display module 200 according to the exemplary embodiment includes the protective member SP including the light shielding layer, the display module 200 may have an increased light shielding effect and an increased impact resistance. In addition, the electronic apparatus EA having improved reliability against external impacts and stress generated during use and improved visibility may be provided.

The heat dissipating layer may effectively dissipate heat generated by the display module 200. The heat dissipating layer may be provided as a metal plate having superior heat dissipation characteristics. For example, the heat dissipating layer may include at least one compound selected from stainless steel, graphite, copper (Cu), and aluminum (Al). However, exemplary embodiments of the present inventive concepts are not limited thereto. The heat dissipating layer may improve the heat dissipation characteristics and may have electromagnetic wave shielding characteristics or electromagnetic wave absorption characteristics.

In an exemplary embodiment, the cushion layer may be a synthetic resin foam. The cushion layer may include a matrix member and a plurality of pores. The pores may be distributed and defined in the matrix member. The cushion layer may be disposed under the heat dissipating layer. The cushion layer may have an elasticity and may have a porous structure.

Referring to the exemplary embodiment of FIG. 3, the electronic apparatus EA may include the display module 200, a power supply module PM, a first electronic module EM1, and a second electronic module EM2. The display module 200, the power supply module PM, the first electronic module EM1, and the second electronic module EM2 may be electrically connected to each other.

The display module 200 may include a display panel 210 and a sensing sensor 220. The display panel 210 may include various configurations that generate the image IM. The image IM generated by the display panel 210 may be viewed to the user through the first active area F-AA or the second active area R-AA.

The first electronic module EM1 and the second electronic module EM2 may include various functional modules to operate the electronic apparatus EA. In an exemplary embodiment, the first electronic module EM1 may be mounted directly on a motherboard electrically connected to the display module 200 or may be electrically connected to the mother board via a connector after being mounted on a separate substrate.

The first electronic module EM1 may include a control module CM, a wireless communication module TM, an image input module IIM, an audio input module AIM, a memory MM, and an external interface IF. In an exemplary embodiment, one or more of the modules may be electrically connected to the mother board through a flexible circuit board without being mounted on the mother board.

The control module CM may control an overall operation of the electronic apparatus EA. In an exemplary embodiment, the control module CM may be a microprocessor. However, exemplary embodiments of the present inventive concepts are not limited thereto. For example, the control module CM may activate or deactivate the display module 200. The control module CM may also control other modules, such as the image input module IIM, the audio input module AIM, or the like, based on the touch signal provided from the display module 200.

The wireless communication module TM may transmit/receive a wireless signal to/from other terminals using a Bluetooth or WiFi link. However, exemplary embodiments of the present inventive concepts are not limited thereto. The wireless communication module TM may transmit/receive a voice signal using a general communication line. The wireless communication module TM may include a transmitter TM1 that modulates a signal to be transmitted and transmits the modulated signal and a receiver TM2 that demodulates the signal applied thereto.

The image input module 11M may process an image signal and may convert the image signal into image data that may be displayed through the display module 200. The audio input module AIM may receive an external sound signal through a microphone in a record mode or a voice recognition mode and may convert the external sound signal to electrical voice data.

The external interface IF provides an interface between the control module CM and external devices, such as an external charger, a wired/wireless data port, a card (e.g., a memory card and a SIM/UIM card) socket, etc.

The second electronic module EM2 may include an audio output module AOM, a light emitting module LM, a light receiving module LRM, and a camera module CMM. In an exemplary embodiment, the second electronic module EM2 may be mounted directly on the mother board to be electrically connected to the display module 200, may be electrically connected to the display module 200 via a connector after being mounted on a separate substrate, or may be electrically connected to the first electronic module EM1.

The audio output module AOM may convert the sound data provided from the wireless communication module TM or the sound data stored in the memory MM and may output the converted sound data to the outside.

The light emitting module LM may generate a light and may output the light. In an exemplary embodiment, the light emitting module LM may emit an infrared ray. The light emitting module LM may include an LED element. The light receiving module LRM may sense the infrared ray. The light receiving module LRM may be activated when the infrared ray having a predetermined level or higher is sensed. In an exemplary embodiment, the light receiving module LRM may include a complementary metal oxide semiconductor (CMOS) sensor. The infrared ray generated by and output from the light emitting module LM may be reflected by an external object, such as a user's finger or face, and the reflected infrared ray may be incident into the light receiving module LRM. The camera module CMM may take an image of an external object.

The electronic module 400 according to an exemplary embodiment of the present inventive concepts may include at least one of the configurations of the first electronic module EM1 and the second electronic module EM2. For example, the electronic module 400 may include at least one device selected from a camera, a speaker, a light sensor, and a heat sensor.

In an exemplary embodiment, the electronic module 400 may sense the external object applied thereto through the transmission area TA and may provide a sound signal, such as a voice, to the outside through the transmission area TA. However, the electronic module 400 may include various other configurations, and the present inventive concepts are not limited to a specific exemplary embodiment.

In an exemplary embodiment, the electronic apparatus EA may further include a transparent member disposed between the electronic module 400 and the display module 200. The transparent member may be an optically transparent film to allow the external input provided through the transmission area TA to be transmitted to the electronic module 400 through the transparent member. For example, in an exemplary embodiment, the transparent member may be attached to the rear surface of the display module 200 or may be disposed between the display module 200 and the electronic module 400 without using a separate adhesive layer. The electronic apparatus EA according to the present inventive concepts may have a variety of structures, and exemplary embodiments of the present inventive concepts are not limited thereto.

According to an exemplary embodiment of the present inventive concepts, the electronic module 400 may be assembled to overlap the transmission area TA included in the first active area F-AA (refer to FIG. 1A) when viewed in a plane (e.g., in a plane defined in the first and second directions DR1 and DR2). Therefore, the first peripheral area F-NAA (refer to FIG. 1A) may have a reduced size since the electronic module 400 is not accommodated therein and the aesthetics of the electronic apparatus FA may be enhanced.

Referring to the exemplary embodiment of FIG. 4A, the display panel 210 may include a base substrate BS, the pixels PX, a plurality of signal lines including a scan line GL, a data line D1, and a power line PL, and a plurality of display pads DPD. The display area DA and the non-display area NDA may be disposed on the base substrate BS. The base substrate BS may include an insulating substrate. For example, in an exemplary embodiment, the base substrate BS may include a glass substrate, a plastic substrate, or a combination thereof. However, exemplary embodiments of the present inventive concepts are not limited thereto.

The signal lines including a scan line GL, a data line DL, and a power line PL may be connected to the pixels PX to apply electrical signals to the pixels PX. In the exemplary embodiment of FIG. 4A, among the signal lines included in the display panel 210, a scan line GL, a data line DL, and a power line PL are shown as an example. However, exemplary embodiments of the present inventive concepts are not limited thereto and the signal lines may further include at least one of a second power line, an initialization voltage line, and a light emitting control line, etc.

FIG. 4B shows an exemplary embodiment of a equivalent circuit diagram of one pixel PX among the pixels PX. FIG. 4B shows the pixel PX connected to an i-th scan line GLi and an i-th light emitting control line ECU.

The pixel PX may include a light emitting element EE and a pixel circuit CC. The pixel circuit CC may include a plurality of transistors comprising first to seventh transistors T1 to T7 and a capacitor CP. In an exemplary embodiment, the first to seventh transistors T1 to T7 may be formed through a low temperature polycrystalline silicon (LIPS) process or a low temperature polycrystalline oxide (LTPO) process.

The pixel circuit CC may control an amount of current flowing through the light emitting element EE in response to a data signal. The light emitting element EE may emit a light at a predetermined luminance in response to the amount of the current provided from the pixel circuit CC. A first power voltage ELVDD may have a level set higher than a level of a second power voltage ELVSS. In an exemplary embodiment, the light emitting element EE may include an organic light emitting element or a quantum dot light emitting element. However, exemplary embodiments of the present inventive concepts are not limited thereto.

Each of the first to seventh transistors T1 to T7 may include an input electrode (e.g., a source electrode), an output electrode (e.g., a drain electrode), and a control electrode (e.g., a gate electrode). In the present inventive concepts, for the convenience of description, one electrode of the input electrode and the output electrode may be referred to as a "first electrode", and the other electrode of the input electrode and the output electrode may be referred to as a "second electrode".

As shown in the exemplary embodiment of FIG. 4B, a first electrode of the first transistor T1 is connected to the first power voltage ELVDD via a fifth transistor T5, and a second electrode of the first transistor T1 is connected to an anode electrode of the light emitting element EE via a sixth transistor T6. In an exemplary embodiment, the first transistor T1 may be referred to as a "driving transistor".

The first transistor T1 controls the amount of the current flowing through the light emitting element EE in response to a voltage applied to a control electrode (e.g., a gate electrode) of the first transistor T1.

A second transistor T2 is connected between the data line DL and the first electrode of the first transistor T1. A control electrode of the second transistor T2 is connected to the i-th scan line GLi. When an i-th scan signal is applied to the i-th scan line GLi, the second transistor T2 is turned on to electrically connect the data line DL to the first electrode of the first transistor T1.

A third transistor T3 is connected between the second electrode of the first transistor T1 and the control electrode of the first transistor T1. A control electrode of the third transistor T3 is connected to the i-th scan line GLi. When the i-th scan signal is applied to the i-th scan line GLi, the third transistor T3 is turned on to electrically connect the second electrode of the first transistor T1 to the control electrode of the first transistor T1. Accordingly, when the third transistor T3 is turned on, the first transistor T1 is connected in a diode configuration.

A fourth transistor T4 is connected between a node ND and an initialization power generator. A control electrode of the fourth transistor T4 is connected to an (i−1)th scan line GLi−1. When an (i−1)th scan signal is applied to the (i−1)th scan line GLi−1, the fourth transistor T4 is turned on to apply an initialization voltage Vint to the node ND.

The fifth transistor T5 is connected between the power line PL and the first electrode of the first transistor T1. A control electrode of the fifth transistor T5 is connected to the i-th light emitting control line ECLi.

The sixth transistor T6 is connected between the second electrode of the first transistor T1 and the anode electrode of the light emitting element EE. A control electrode of the sixth transistor T6 is connected to the i-th light emitting control line ECU.

A seventh transistor T7 is connected between the initialization power generator and the anode electrode of the light emitting element EE. A control electrode of the seventh transistor T7 is connected to an (i+1)th scan line GLi+1. When an (i+1)th scan signal is applied to the (i+1)th scan line GLi+1, the seventh transistor T7 is turned on to apply the initialization voltage Vint to the anode electrode of the light emitting element EE.

The seventh transistor T7 may increase the black expression capability of the pixel PX. For example, when the seventh transistor T7 is turned on, a parasitic capacitor of the light emitting element EE is discharged. Therefore, the light emitting element EE may not emit the light due to a leakage current from the first transistor T1 when black brightness is displayed, and thus, the black expression capability may be increased.

Additionally, the control electrode of the seventh transistor T7 is connected to the (i+1)th scan line GLi+1 in the exemplary embodiment of FIG. 4B. However, exemplary embodiments of the present inventive concepts are not limited thereto. According to another exemplary embodiment of the present inventive concepts, the control electrode of the seventh transistor T7 may be connected to the i-th scan line GLi or the (i−1)th scan line GLi−1.

The capacitor CP is connected between the power line PL and the node ND. The capacitor CP is charged with a voltage corresponding to the data signal. When the fifth transistor T5 and the sixth transistor T6 are turned on, the amount of the current flowing through the first transistor T1 may be determined-b the voltage charged in the capacitor CP.

However, the equivalent circuit of the pixel PX should not be limited to that shown in the exemplary embodiment of FIG. 4B and the equivalent circuit may have various different arrangements. For example, in another exemplary embodiment, the pixel PX may be implemented in various ways to allow the light emitting element EE to emit the light. FIG. 4B shows a PMOS as a reference of the pixel circuit CC. However, exemplary embodiments of the present inventive concepts are not limited thereto and the pixel circuit CC may be implemented by an NMOS in other exemplary embodiments. According to another embodiment, the pixel circuit CC may be implemented by a combination of the NMOS and the PMOS. Furthermore, in some exemplary embodiments, the control electrode (e.g., the gate electrode) may be implemented as a dual gate electrode, etc.

FIG. 4C is an enlarged view showing an area adjacent to the panel hole D-H of the display panel 210. In an exemplary embodiment, the panel hole D-H may be defined in the display area DA. Accordingly, at least some pixels PX among the pixels PX receiving the same signal may be disposed to be spaced apart from each other with the panel hole D-H interposed therebetween. FIG. 4C shows a first hole line SL1 and a second hole line SL2 among the hole lines connecting the pixels PX spaced apart from each other by the panel hole D-H. While the exemplary embodiment of FIG. 4C shows first and second hole lines SL1, SL2 for convenience of illustration, the numbers of the hole lines are not limited thereby.

An area in which the first and second hole lines SL1 and SL2 connecting the pixels PX disconnected from each other or spaced apart from each other by the panel hole D-1H are arranged may be defined as a hole line area HL. Accordingly, the first and second hole lines SL1 and SL2 may surround at least a partial portion of the panel hole D-H.

As shown in the exemplary embodiment of FIG. 4C, the first hole line SL1 may extend in the first direction DR1. The first hole line SL1 may be connected to the pixels PX arranged in the same row in the first direction DR1 among the pixels PX. In an exemplary embodiment, the first hole line SL1 may correspond to the scan line GL. However, exemplary embodiments of the present inventive concepts are not limited thereto.

Some pixels PX of the pixels PX connected to the first hole line SL1 may be disposed at a left side with respect to the panel hole D-H (e.g., in the first direction DR1), and the other pixels PX connected to the first hole line SL1 may be disposed at a right side with respect to the panel hole D-H (e.g., in the first direction DR1). Therefore, the pixels PX arranged in the same row and connected to the first hole line SL1 may be turned on or off in response to the same gate signal even though some pixels PX are omitted around the panel hole D-H.

The second hole line SL2 may extend in the second direction DR2. The second hole line SL2 may be connected to the pixels PX arranged in the same column in the second direction DR2 among the pixels PX, in an exemplary embodiment, the second hole line SL2 may be the data line DL. However, exemplary embodiments of the present inventive concepts are not limited thereto.

Some pixels PX of the pixels PX connected to the second hole line SL2 may be disposed at an upper side with respect to the panel hole D-H (e.g., in the second direction DR2), and the other pixels PX connected to the second hole line SL2 may be disposed at a lower side with respect to the panel hole D-H (e.g., in the second direction DR2). Therefore, the pixels PX arranged in the same column and connected to the second hole line SL2 may receive the data signal through the same line even though some pixels PX are omitted around the panel hole D-H.

Meanwhile, the display module 200 according to an exemplary embodiment of the present inventive concepts may further include a connection pattern disposed in the hole line area HL. In this embodiment, the first hole line SL1 may be disconnected in an area overlapping the panel hole D-H. The disconnected portions of the first hole line SL1 may be connected to each other through the connection pattern. Similarly, the second hole line SL2 may be disconnected in an area overlapping the panel hole D-H. The disconnected portions of the second hole line SL2 may be connected to each other through the connection pattern.

A groove pattern GV may be defined in the hole line area HL. The groove pattern GV may be provided by at least a partial portion of the base substrate BS and at least a partial portion of insulating layers disposed on the base substrate BS that is recessed toward the third direction DR3.

The groove pattern GV may prevent moisture and oxygen introduced through a side surface of the display module 200, which forms a panel hole D-H, from entering the pixels PX.

As shown in the exemplary embodiment of FIG. 4C, the groove pattern GV may have a circular ring shape surrounding an edge of the panel hole D-H when viewed in a plane (e.g., in a plane defined in the first and second directions DR1, DR2). However, exemplary embodiments of the present inventive concepts are not limited thereto. For example, the groove pattern GV may have a shape different from that of a module hole MH (refer to FIG. 5) or may have a polygonal shape, an oval shape, a closed-line shape including at least a curved portion, or a shape including a plurality of patterns that is partially disconnected, etc.

According to the present inventive concepts, the light shielding pattern CR may be disposed on the upper surface BPL-U of the impact absorbing layer BPL and may overlap the hole line area HL (e.g., in the third direction DR3). Accordingly, the light shielding pattern CR may cover at least a partial portion of the first and second hole lines SL and SL2. Therefore, the light shielding pattern CR may prevent the first and second hole lines SL1 and SL2 from being viewed by the user. Therefore, the electronic apparatus EA with enhanced aesthetics may be provided.

Referring to the exemplary embodiment of FIG. 4A, a power pattern VDD may be disposed in the non-display area NDA. For example, as shown in the exemplary embodiment of FIG. 4A, the power pattern VDD may be disposed on a lower side of the non-display area NDA (e.g., in the second direction DR2). However, exemplary embodiments of the present inventive concepts are not limited thereto. In the present exemplary embodiment, the power pattern VDD may be connected to the power lines PL. Accordingly, the display panel 210 may include the power pattern VDD, and thus, the pixels PX may receive the same first power supply signal.

The display pads DPD may include a first pad P1 and a second pad P2 that are spaced apart from each other (e.g., in the first direction DR1). In an exemplary embodiment, the first pad P1 may be provided in plural number, and the first pads P1 may be respectively connected to the data lines DL. The second pad P2 may be connected to the power pattern VDD to be electrically connected to the power line PL. The display panel 210 may apply the electrical signals, which are provided from the outside through the display pads DPD, to the pixels PX. However, the display pads DPD may further include pads to receive other electrical signals in addition to the first and second pads P1 and P2, and the display pads DPD should not be limited to any particular exemplary embodiment.

Figure 5:
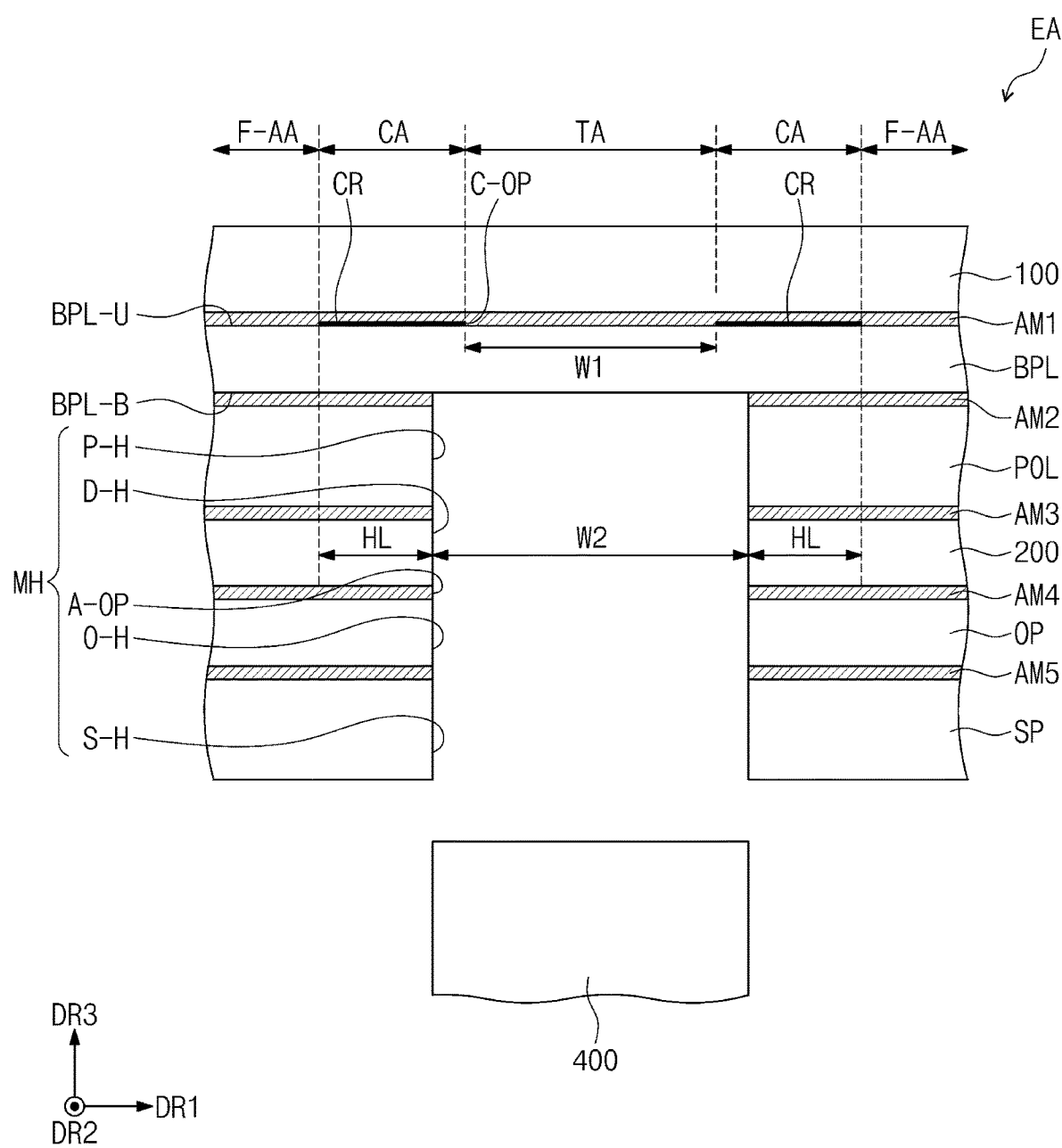

FIG. 5 is a cross-sectional view showing the electronic apparatus EA according to an exemplary embodiment of the present inventive concepts. For the convenience of explanation, the external case 500 shown in the exemplary embodiment of FIG. 2 among the components of the electronic apparatus EA is omitted in FIG. 5.

The electronic apparatus EA according to the present inventive concepts may include the protective member SP, the compensation film OP, the display module 200, the optical member POL, the impact absorbing layer BPL, and the window 100, which are consecutively stacked in the third direction DR3. In addition, the electronic apparatus EA may include first to fifth adhesive layers AM1, AM2, AM3, AM4, and AM5 disposed between the protective member SR the compensation film OP, the display module 200, the optical member POL, the impact absorbing layer BPL, and the window 100 to combine the protective member SP, the compensation film OP, the display module 200, the optical member POL, the impact absorbing layer BPL, and the window 100 with each other.

The first to fifth adhesive layers AM1, AM2, AM3, AM4, and AM5 according to the present inventive concepts may include an adhesive material. For example, the first to fifth adhesive layers AM1, AM2, AM3, AM4, and AM5 may include a pressure sensitive adhesive (PSA), an optical clear adhesive (OCA), or an optical clear resin (OCR). In addition, the first to fifth adhesive layers AM1, AM2, AM3, AM4, and AM5 may include a light-curable adhesive material or a heat-curable adhesive material. However, exemplary embodiments of the present inventive concepts are not limited thereto and the material for the first to fifth adhesive layers AM1, AM2, AM3, AM4, and AM5 may vary.

A first adhesive layer AM1 may be disposed between the window 100 and the impact absorbing layer BPL (e.g., in the third direction DR3) and may attach a lower surface of the window 100 to the upper surface BPL-U of the impact absorbing layer BPL. In an exemplary embodiment, the first adhesive layer AM1 may be disposed on an entire surface of the impact absorbing layer BPL and may cover the light shielding pattern CR. A second adhesive layer AM2 may be disposed between the impact absorbing layer BPL and the optical member POL (e.g., in the third direction DR3) and may attach a lower surface of the impact absorbing layer BPL to an upper surface of the optical member POL. A third adhesive layer AM3 may be disposed between the optical member POL and the display module 200 (e.g., in the third direction DR3) and may attach a lower surface of the optical member POL to an upper surface IS of the display module 200. A fourth adhesive layer AM4 may be disposed between the display module 200 and the compensation film OP (e.g., in the third direction DR3) and may attach a lower surface of the display module 200 to an upper surface of the compensation film OP. A fifth adhesive layer AM5 may be disposed between the compensation film OP and the protective member SP (e.g., in the third direction DR3) and may attach a lower surface of the compensation film OP to an upper surface of the protective member SP.

The light shielding pattern CR according to an exemplary embodiment of the present inventive concepts may overlap at least a partial portion of the hole line area HL. Accordingly, the light shielding pattern CR may cover the hole lines SL1 and SL2 (refer to FIG. 4C) disposed in the hole line area HL.

According to an exemplary embodiment of the present inventive concepts, the optical member hole P-H, the panel hole D-H, the compensation film hole O-H, and the protective member hole S-H respectively defined through the optical member POL, the display module 200, the compensation film OP, and the protective member SP and adhesive openings A-OP defined through the second through fifth adhesive layers AM2, AM3, AM4, and AM5 may be aligned with each other in the first and second directions D1, D2 and may overlap each other in the third direction DR3 to collectively form the module hole MH. The module hole MH may overlap the electronic module 400 (e.g., in the third direction DR3). The light shielding pattern CR may overlap the module hole MH (e.g., in the third direction DR3).

The light shielding pattern CR may be disposed on the upper surface BPL-U of the impact absorbing layer BPL and may define the light shielding area CA of the window 100 which overlaps the light shielding pattern CR (e.g., in the third direction DR3) and is surrounded by the first active area F-AA. The transmission area TA of the window 100 may be defined by the transmission opening C-OP defined by the light shielding pattern CR and the transmission area TA may overlap the transmission opening C-OP (e.g., in the third direction DR3). The transmission area TA may overlap at least a portion of the electronic module 400 (e.g., in the third direction DR3).

According to an exemplary embodiment of the present inventive concepts, the transmission opening C-OP may have a first width W1 in the first direction DR1, and the module hole MH may have a second width W2 in the first direction DR1. As shown in the exemplary embodiment of FIG. 5, the first width W1 may be smaller than the second width W2. Accordingly, the first width W1 of the transmission opening C-OP may be smaller than a width of the adhesive opening A-OP. Therefore, a partial portion of light shielding pattern CR may overlap the module hole MH (e.g., in the third direction DR3).

According to an exemplary embodiment of the present inventive concepts, since the light shielding pattern CR is disposed on the upper surface BPL-U rather than the lower surface BPL-B of the impact absorbing layer BPL, a reliability of the electronic module 400 may be improved. For example, in an exemplary embodiment, the light shielding pattern CR may be printed on the impact absorbing layer BPL and protective films may then be attached to the upper surface BPL-U and the lower surface BPL-B of the impact absorbing layer BPL. The impact absorbing layer BPL may then be transported and stored. Then, when the electronic apparatus EA is manufactured, the protective films attached to the upper surface BPL-U and the lower surface BPL-B of the impact absorbing layer BPL are removed, and the impact absorbing layer BPL may be attached to the optical member POL.

In this exemplary embodiment, in instances in which the light shielding pattern CR is printed on the lower surface BPL-B of the impact absorbing layer BPL, the protective film may not be in contact with the lower surface BPL-B of the impact absorbing layer BPL due to a decreased thickness in the third direction DR3 of the light shielding pattern CR in the area overlapping the transmission opening C-OP. Since a predetermined air layer may be formed in a space in which the protective film is not in contact with the lower surface BPL-B of the impact absorbing layer BPL and the second adhesive layer AM2 is not disposed on the lower surface BPL-B overlapping the transmission opening C-OP, a foreign substance may be generated on the lower surface BPL-B of the impact absorbing layer BPL, and thus, the reliability of the electronic module 400 may be lowered.

According to the present inventive concepts, the light shielding pattern CR may be disposed on the upper surface BPL-U of the impact absorbing layer BPL. Accordingly, although the air layer is formed on the upper surface BPL-U of the impact absorbing layer BPL during the transport and storage, it is possible to reduce the foreign substance from being generated due to the air layer in the process of attaching the first adhesive layer AM1 to the upper surface BPL-J of the impact absorbing layer BPL. Therefore, the electronic apparatus EA with increased reliability may be provided.

Figure 6A:
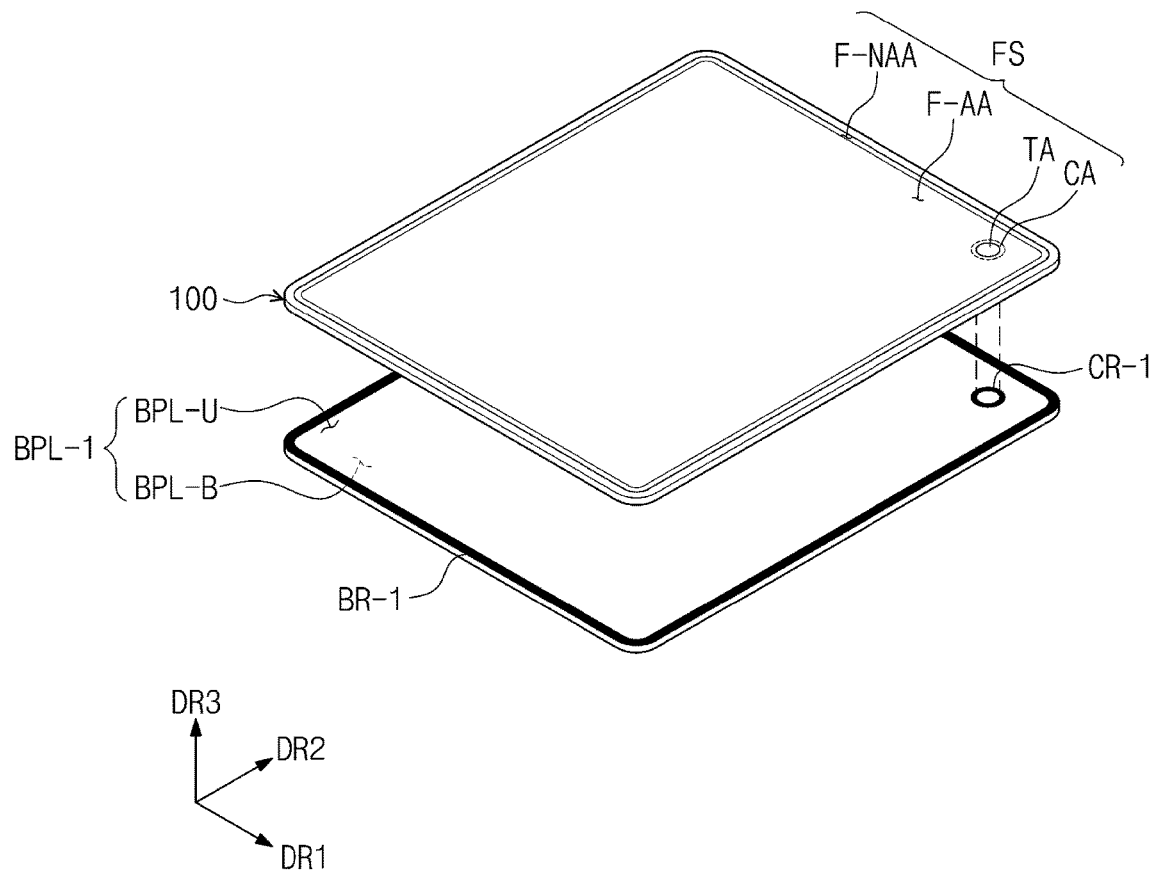
Figure 6B:
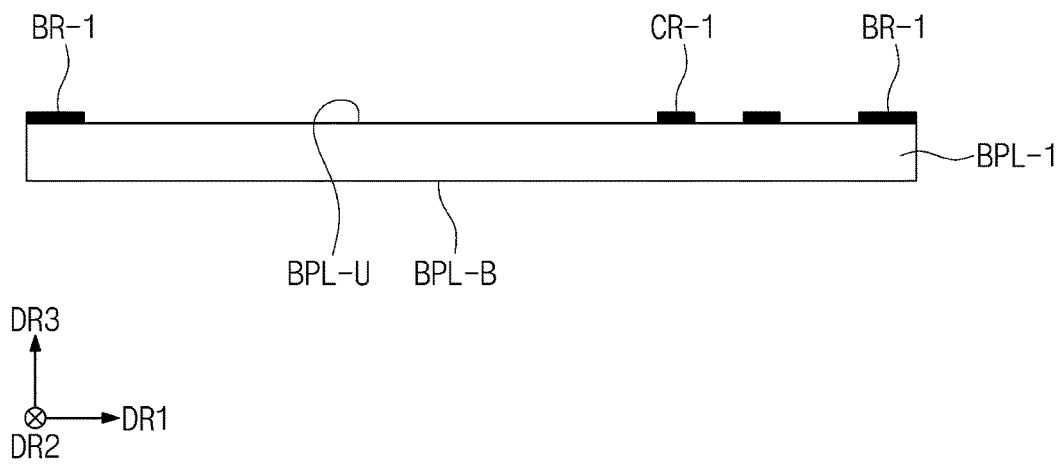
Figure 7:
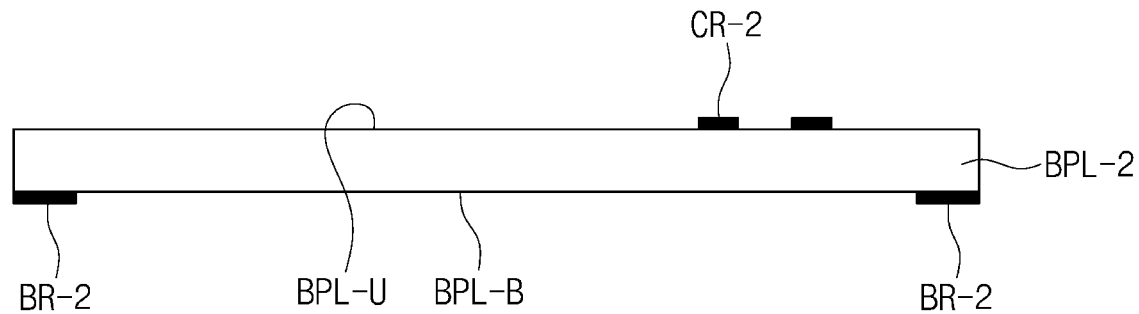
Figure 7:
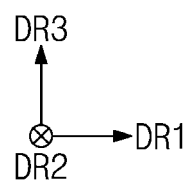

FIG. 6A is a perspective view showing a configuration of an electronic apparatus according to an exemplary embodiment of the present disclosure. FIG. 6B is a cross-sectional view showing an impact absorbing layer according to an exemplary embodiment of the present disclosure. FIG. 7 is a cross-sectional view showing an impact absorbing layer according to an exemplary embodiment of the present disclosure. In FIGS. 6A, 6B, and 7, the same/similar reference numerals denote the same/similar elements in FIGS. 1A to 5, and thus, detailed descriptions of the same/similar elements will be omitted.

Referring to the exemplary embodiments of FIGS. 6A and 6B, the electronic apparatus may further include a bezel pattern BR-1. The bezel pattern BR-1 may be disposed on the same layer as a light shielding pattern CR-1. For example, the bezel pattern BR-1 may be disposed on an upper surface BPL-U of an impact absorbing layer BPL-1. The bezel pattern BR-1 may surround at least one edge of the impact absorbing layer BPL-1. For example, as shown in the exemplary embodiment of FIG. 6A, the bezel pattern BR-1 may surround all four edges of the impact absorbing layer BPL-1. However, exemplary embodiments of the present inventive concepts are not limited thereto. In an exemplary embodiment, the bezel pattern BR-1 and the light shielding pattern CR-1 may be formed through the same processes using the same mask. Therefore, the bezel pattern BR-1 may include the same material as the material of the light shielding pattern CR-1.

As the bezel pattern BR-1 is disposed on the upper surface BPL-U of the impact absorbing layer BPL-1, a portion of a window 100 overlapping the bezel pattern BR-1 (e.g., in the third direction DR3) may be defined as the first peripheral area F-NAA.

According to the present exemplary embodiment, as the bezel pattern BR-1 and the light shielding pattern CR-1 are formed on the same layer, a separate process of defining the first peripheral area F-NAA in the window 100 may be omitted.

Referring to the exemplary embodiment of FIG. 7, a bezel pattern BR-2 may be disposed on a different layer than the upper surface BPL-U of the impact absorbing layer BPL-2 on which the light shielding pattern CR-2 is disposed. For example, as shown in the exemplary embodiment of FIG. 7, the light shielding pattern CR-2 may be disposed on an upper surface BPL-U of the impact absorbing layer BPL-2, and the bezel pattern BR-2 may be disposed on a lower surface BPL-B of the impact absorbing layer BPL-2.

Figure 8:
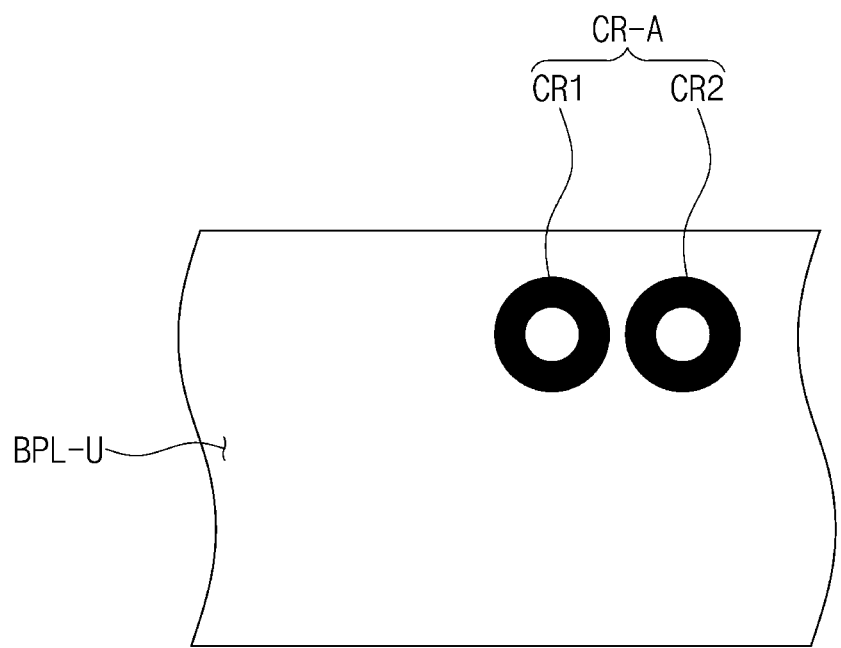
Figure 9:
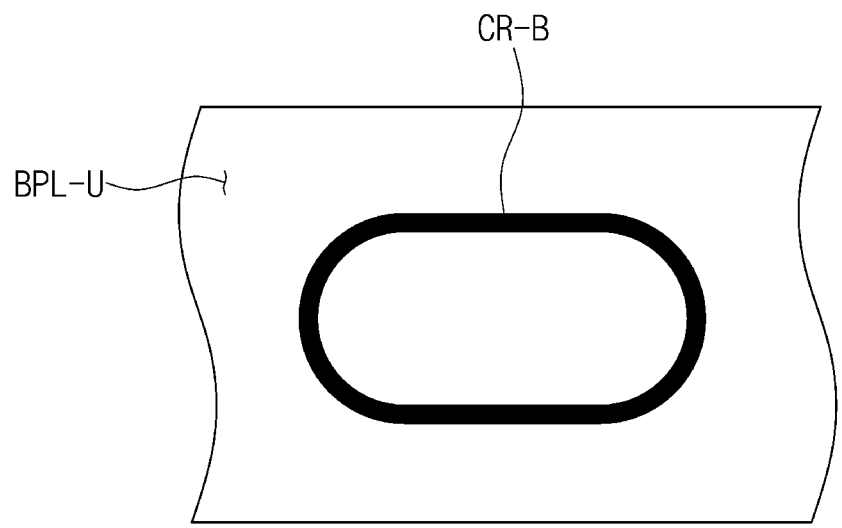
Figure 10:
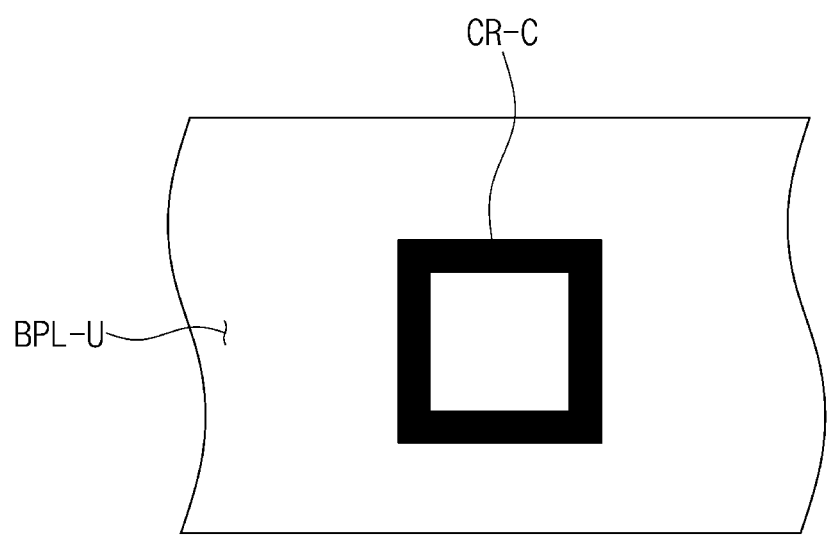

FIG. 8 is a plan view showing a camera ring and an impact absorbing layer according to an exemplary embodiment of the present inventive concepts. FIG. 9 is a plan view showing a camera ring and an impact absorbing layer according to an exemplary embodiment of the present inventive concepts. FIG. 10 is a plan view showing a camera ring and an impact absorbing layer according to an exemplary embodiment of the present inventive concepts. In the exemplary embodiments of FIGS. 8 to 10, the same or similar reference numerals denote the same or similar elements in the exemplary embodiments of FIGS. 1A to 5, and thus, detailed descriptions of the same or similar elements will be omitted for convenience of explanation.

In the exemplary embodiment of FIGS. 8-10, the shape and number of the light shielding patterns may be changed to correspond to the shape and number of the electronic modules 400. Hereinafter, descriptions of the shape and number of the electronic modules 400 are omitted in the exemplary embodiments of FIGS. 8 to 10, and for the convenience of explanation, exemplary embodiments related to the shape and number of the light shielding patterns will be described which may correspond to the shape and number of the electronic modules 400.

Referring to the exemplary embodiment of FIG. 8, a light shielding pattern CR-A disposed on an upper surface BPL-U of an impact absorbing layer may be provided in plural. The light shielding pattern CR-A may include a first light shielding pattern CR1 and a second light shielding pattern CR2 spaced apart from the first light shielding pattern CR1.

Each of the first and second light shielding patterns CR1 and CR2 may have a circular shape. However, exemplary embodiments of the present inventive concepts are not limited thereto. For example, in other exemplary embodiments, each of the first and second light shielding patterns CR1 and CR2 may have an oval shape or a polygonal shape. In an exemplary embodiment, the first and second light shielding patterns CR1 and CR2 may have different shapes from each other. In other exemplary embodiments, three or more light shielding patterns may be disposed on the upper surface BPL-U of the impact absorbing layer to correspond to the plurality of electronic modules 400 of the electronic apparatus EA.

Referring to the exemplary embodiment of FIG. 9, a light shielding pattern CR-B disposed on an upper surface BPL-U of an impact absorbing layer may have an oval shape. In an exemplary embodiment, the electronic module may be provided in plural, and the light shielding pattern CR-B may surround the portion of the impact absorbing layer overlapping all of the electronic modules.

Referring to the exemplary embodiment of FIG. 10, a light shielding pattern CR-C disposed on an upper surface BPL-U of an impact absorbing layer may have a polygonal shape. In the exemplary embodiment of FIG. 10, the light shielding pattern CR-C has a square shape. However, exemplary embodiment of the present inventive concepts are not limited thereto and the light shielding pattern CR-C may have another polygonal shape in other exemplary embodiments.

Although exemplary embodiments of the present inventive concepts have been described, it is understood that the present inventive concepts are not limited to these exemplary embodiments but various changes and modifications can be made by one ordinary skilled in the art within the spirit and scope of the present inventive concepts. Therefore, the present inventive concepts should not be limited to the exemplary embodiments described herein.

What is claimed is:

1. An electronic apparatus comprising:
    an electronic module;
    a display module comprising a plurality of pixels, the display module including a panel hole that extends through an upper surface and a lower surface of the display module and overlaps the electronic module;
    an impact absorbing layer disposed on the display module, the impact absorbing layer including a lower surface adjacent to the display module and an upper surface opposite to the lower surface;
    a light shielding pattern disposed on the upper surface of the impact absorbing layer and provided with a transmission opening defined therein to overlap the panel hole and the electronic module;
    a window disposed on the impact absorbing layer, wherein the light shielding pattern has a closed-line shape; and
    a first adhesive layer disposed between the impact absorbing layer and the window, and covering the light shielding pattern.

2. The electronic apparatus of claim 1, wherein a width in a first direction of the transmission opening is smaller than a width in the first direction of the panel hole.

3. The electronic apparatus of claim 1, further comprising a bezel pattern that surrounds at least one edge of the impact absorbing layer.

4. The electronic apparatus of claim 3, wherein the window comprises:
    a transmission area overlapping the transmission opening;
    a light shielding area that overlaps the light shielding pattern;
    an active area surrounding at least a partial portion of the light shielding pattern; and
    a peripheral area adjacent to the active area, the peripheral area overlapping the bezel pattern.

5. The electronic apparatus of claim 3, wherein the bezel pattern is disposed on the upper surface of the impact absorbing layer.

6. The electronic apparatus of claim 3, wherein the bezel pattern is disposed on the lower surface of the impact absorbing layer.

7. The electronic apparatus of claim 1, wherein:
    the display module comprising a plurality of hole lines that are configured to connect first pixels of the plurality of pixels that are spaced apart from each other by the panel hole and to receive a same signal among the first pixels; and
    at least a partial portion of the plurality of hole lines overlaps the light shielding pattern.

8. The electronic apparatus of claim 1, wherein the light shielding pattern has a black color.

9. The electronic apparatus of claim 1, wherein the light shielding pattern includes a plurality of light shielding patterns.

10. The electronic apparatus of claim 1, wherein the transmission opening has a shape selected from a circle, an oval, and a polygon.

11. The electronic apparatus of claim 1, wherein the electronic apparatus is configured to be folded about a folding axis extending in one direction.

12. The electronic apparatus of claim 1, further comprising:
    a protective member disposed on the lower surface of the display module, the protective member including at least one layer selected from a light shielding layer, a heat dissipating layer, and a cushion layer; and
    the protective member includes an upper surface adjacent to the display module and a lower surface opposite to the upper surface, wherein a protective member hole extends through the upper and lower surfaces of the protective member.

13. The electronic apparatus of claim 1, further comprising:
    an optical member disposed between the impact absorbing layer and the display module, the optical member including an upper surface adjacent to the impact absorbing layer and a lower surface adjacent to the display module;
    the optical member includes an optical member hole that extends through the upper surface and lower surfaces of the optical member.

14. The electronic apparatus of claim 13, further comprising:
    a second adhesive layer that is configured to attach the impact absorbing layer to the optical member, wherein the first adhesive layer is disposed on an entire surface of the impact absorbing layer and covers the light shielding pattern;

wherein the second adhesive layer includes an adhesive opening that extends through the second adhesive layer, the adhesive opening overlaps with the transmission opening.

15. The electronic apparatus of claim 1, wherein the electronic module includes at least one module selected from: an audio output module, a light emitting module, a light receiving module, and a camera module.

16. An electronic apparatus comprising:
a window;
a display module disposed under the window and comprising a plurality of pixels;
an impact absorbing layer disposed between the display module and the window and including an upper surface that faces the window;
an optical member disposed between the display module and the impact absorbing layer;
a protective member disposed under the display module;
a light shielding pattern disposed on the upper surface of the impact absorbing layer;
an adhesive layer disposed between the impact absorbing layer and the window, and covering the light shielding pattern; and
an electronic module disposed under the display module,
wherein a module hole extends through the display module, the optical member, and the protective member to overlap the electronic module, and the light shielding pattern includes a transmission opening overlapping the module hole, the light shielding pattern having a closed-line shape.

17. The electronic apparatus of claim 16, wherein a width in a first direction of the transmission opening is smaller than a width in the first direction of the module hole.

18. The electronic apparatus of claim 16, further comprising a bezel pattern that surrounds at least one edge of the impact absorbing layer.

19. The electronic apparatus of claim 18, wherein the window comprises:
a transmission area overlapping the transmission opening;
a light shielding area that overlaps the light shielding pattern;
an active area surrounding at least a portion of the light shielding pattern; and
a peripheral area adjacent to the active area, the peripheral area overlapping the bezel pattern.

20. The electronic apparatus of claim 18, wherein the bezel pattern is disposed on the upper surface of the impact absorbing layer.

21. The electronic apparatus of claim 18, wherein the bezel pattern is disposed on a lower surface of the impact absorbing layer.

22. The electronic apparatus of claim 16, wherein the display module comprises a plurality of hole lines that are configured to connect the plurality of pixels spaced apart from each other by the module hole and receive a same signal among the plurality of pixels; and
at least a partial portion of the plurality of hole lines overlaps the light shielding pattern.

23. The electronic apparatus of claim 16, wherein the light shielding pattern has a black color.

* * * * *